Feb. 2, 1932.   L. W. THOMPSON   1,843,745

ELECTRICAL REGULATING MEANS

Filed April 29, 1930

Inventor:
Louis W. Thompson,
by Charles E. Tullar
His Attorney.

Patented Feb. 2, 1932

1,843,745

UNITED STATES PATENT OFFICE

LOUIS W. THOMPSON, OF SCHENECTADY, NEW YORK, ASSIGNOR TO GENERAL ELECTRIC COMPANY, A CORPORATION OF NEW YORK

ELECTRICAL REGULATING MEANS

Application filed April 29, 1930. Serial No. 448,394.

My invention relates to electrical regulating means and more particulary to alternating current feeder circuit voltage regulating means.

Due to the drop in voltage along a current carrying conductor, which varies with the current, it is customary to provide means for automatically regulating the voltage at a point in feeder circuits so as to maintain the voltage of such circuits at this point substantially constant for different loads thereon. This is of course desirable as most load devices are designed to operate best at but one voltage and accordingly the voltage regulating means is usually placed in the circuit as near the point of connection of the load devices as practicable. The majority of such regulators, which are usually known in the art as feeder voltage regulators, comprise heavy relatively movable parts with the result that they are often sluggish in action and subject to wear in their moving parts.

In accordance with my invention I provide a relatively inexpensive feeder regulator which requires a small amount of space, so that it may conveniently be placed nearer to the point of connection of the load devices than heretofore, as in the same container with a pole type distribution transformer, for example, and which, as it operates on the principle of magnetic saturation, requires no moving parts.

It is an object of my invention to provide a new and improved electrical regulating means.

It is another object of my invention to provide a new and improved feeder voltage regulator which has no moving parts.

My invention will be better understood from the following description taken in connection with the accompanying drawings and its scope will be pointed out in the appended claims.

Figure 1:
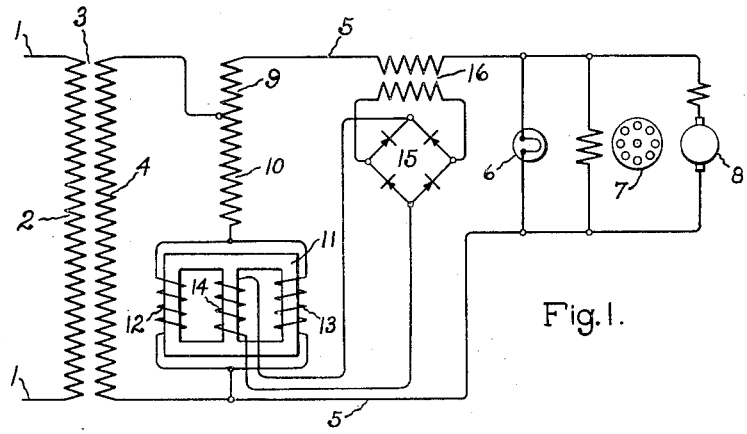
Figure 2:
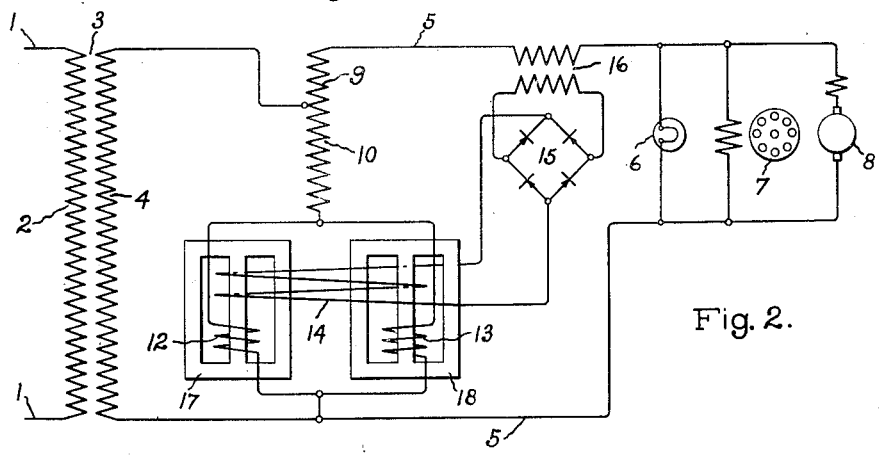
Figure 3:
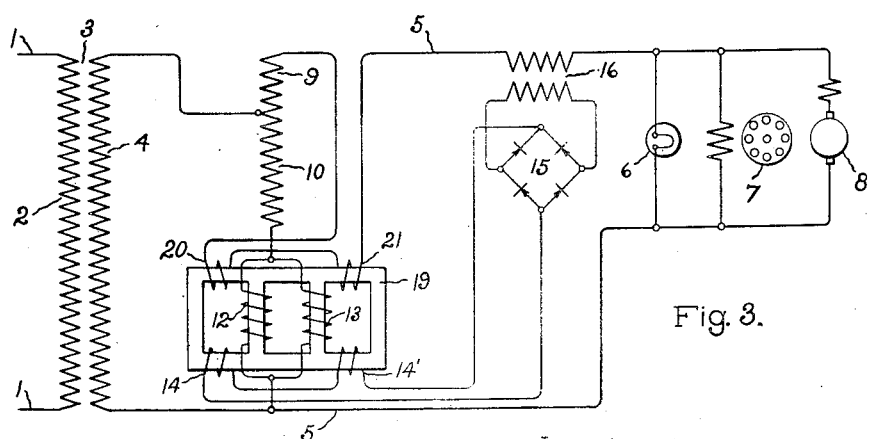

In the drawings, in which similar reference characters refere to similar elements throughout the several figures, Fig. 1 is a diagrammatic showing of a simple embodiment of my invention, Fig. 2 shows a modification thereof in which the saturable element has two cores, and Fig. 3 shows diagrammatically another modification which has an improved no load performance.

Referring now to Fig. 1, character 1 designates an ordinary substantially constant voltage alternating current power supply circuit to which is connected the primary winding 2 of a distribution transformer 3. The secondary winding 4 of this transformer is connected to a load or feeder circuit 5 to which are connected a plurality of load devices, such as a lamp 6, an induction motor 7 and an alternating current commutator motor 8, which collectively may be taken to represent a typical feeder circuit load. For producing a regulatory voltage in circuit 5 which compensates for the voltage drop in the conductors I provide voltage boosting means, which in embodiment shown is a booster auto transformer having a series winding 9 and a shunt winding 10.

In order to vary the voltage across shunt winding 10 and consequently the boosting voltage induced in the series winding 9, I provide a saturable reactor connected in series with the shunt winding. This reactor may be of any type but it is preferable, in order to increase the range of my regulator, that it be provided with a direct current saturating winding. This renders desirable a special kind of reactor for if a direct current saturating coil is wound on a simple single alternating current coil reactor an objectionable alternating voltage is inducted in the former and also, due to the constant direction magnetic bias produced by the saturating coil, the two halves of the alternating current wave will be unequally distorted, thus producing even harmonics. Many different kinds of reactors may be employed to overcome these difficulties without departing from my invention. One such reactor is shown in Fig. 1 and it comprises a three-legged core 11, a pair of alternating current coils 12 and 13 wound on the outer legs thereof and a direct current saturating coil 14 wound on the center leg thereof. Coils 12 and 13 are so wound that no appreciable alternating flux passes through the center leg of the core and consequently no alternating voltage is induced in coil 14.

Saturating coil 14 is energized in accordance with the magnitude of the current in circuit 5 by means of a rectifier of any suitable type, as a copper oxide type rectifier 15, which is preferably connected to circuit 5 through a current transformer 16, as it is usually undesirable that the current in coil 14 be of the same magnitude as the load current in circuit 5.

The operation of the embodiment of my invention shown in Fig. 1 is as follows: Assume that power supply circuit 1 is energized and that a load is placed on circuit 5. Under ordinary circumstances it is of course obvious that the current through circuits 1 and 5 and through transformer 2 will cause a drop in voltage at the terminals of the load devices. However, as the current in circuit 5 increases due to the load which is connected to it, saturating coil 14 will have an increased direct current flowing through it through the action of the rectifier 15 and transformer 16. The result will be that the reactance of the reactor decreases thus decreasing the ratio of the voltage drops across the reactor and the shunt winding or in other words increasing the voltage across the shunt winding with the result that an increased voltage boost is induced in series winding 9. It should be noted that even without the presence of saturating winding 14 a certain amount of regulation takes place for the increase in current flow through winding 9 causes an increase in current to flow in winding 10 and in the reactor windings 12 and 13 due to the inductive relation of windings 9 and 10. The increased current in the reactor increases its saturation and hence the voltage across winding 10. However, the saturating winding connected as shown gives a much better regulation. Obviously a reduction in load will result in a reduction of saturating current and hence in a reduction in voltage boost by winding 9.

The embodiment of my invention shown in Fig. 2 differs from that shown in Fig. 1 in that the two alternating current reactor coils 12 and 13 are wound on the center legs of separate three-legged cores 17 and 18 respectively, the saturating coil 14 linking only the center legs of each of these cores. The result is that there is less leakage flux associated with each alternating current coil, as each coil has a greater core area than in the arrangement of Fig. 1, and consequently a wider range of control of the reactors through saturation is obtainable. The operation of this modification is otherwise the same as that of the embodiment illustrated in Fig. 1.

The modification illustrated in Fig. 3 differs from Fig. 1 in that still another type of reactor is shown and also in that a pair of additional windings 20 and 21 are placed on the reactor and connected in series in circuit 5, the purpose of the latter being to improve the no load regulating characteristic of my invention. In this case the reactor consists of a four-legged core 19 having the alternating current coils 12 and 13 wound on the inner legs thereof, these coils in this instance being so wound that the alternating fluxes produced thereby traverse separate paths including the outer legs of the core respectively. Consequently, as the alternating fluxes traverse separate paths, the direct current saturating winding is divided into two coils 14 and 14' so connected that the direct current flux traverses a path including both outer legs of the core. As a result the voltages induced in the coils 14 and 14' are in opposition. The coils 20 and 21 are so connected that the voltages induced therein are in phase with each other and in opposition to the voltage of circuit 5.

The function of coils 20 and 21 is to produce at no load on circuit 5 a slight voltage buck which serves to neutralize the slight voltage boost induced in series winding 9 as a result of the exciting current which flows through shunt winding 10. As the current in circuit 5 increases, these coils help to saturate the reactor thus improving the action of the regulator and at the same time the bucking voltage induced in them is released due to saturation of the core. Obviously only one such coil is necessary but it is better to provide two so as to not unbalance the two halves of the reactor.

While I have shown and described particular embodiments of my invention it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, a substantially constant voltage source of current, a variable load circuit connected thereto, a booster transformer connected to said load circuit, and means responsive to the current in said circuit for causing said booster transformer to produce a voltage boost that substantially compensates for the voltage drop in said circuit which is produced by said current.

2. In combination, an alternating current circuit, a booster transformer connected to said circuit, a saturable reactor, means connecting said reactor to said transformer so that variations in the saturation of said reactor produce variations in an electrical condition of said transformer, and means including a rectifier for varying the saturation of said reactor in substantially direct proportion to variations in the current in said circuit.

3. In combination, an alternating current circuit, means including a saturable reactor for producing a voltage boost in said circuit in proportion to the degree of saturation of said reactor, a direct current saturating winding on said reactor, and means including a rectifier for varying the energization of said saturating winding in substantially direct proportion to variations in the current in said circuit.

4. Voltage regulating means having, in combination, an alternating current circuit, a booster transformer including a voltage boosting series winding in said circuit and a shunt winding across said circuit, a saturable reactor connected in series with said shunt winding, and means for varying the saturation of said reactor in accordance with variations in the current in said circuit.

5. In combination, an alternating current circuit, means connected to said circuit for producing a voltage boost therein which varies in proportion to variations in the current in said circuit, said means producing an appreciable voltage boost when the current in said circuit is substantially zero, and means for producing a voltage buck in said circuit which neutralizes said voltage boost when the current in said circuit is substantially zero.

6. In combination, an alternating current circuit, a variable load connected to said circuit, means connected to said circuit for producing a voltage boost therein which varies in accordance with variations in the load current in said circuit, said means producing an appreciable voltage boost at no load, and means connected in said circuit and associated with said first mentioned means for producing a voltage buck which neutralizes the voltage boost of said first mentioned means at no load.

7. In combination, an alternating current circuit, a variable load connected to said circuit, a booster transformer having a voltage boost producing series winding in said circuit and a shunt winding connected across said circuit, a saturable reactor connected in series with said shunt winding, means including a saturating winding on said reactor and a rectifier for varying the saturation of said reactor in accordance with variations in load current in said circuit, and means in said circuit and associated with said reactor for producing a voltage buck in said circuit.

8. In a system of distribution, in combination, an alternating current power supply circuit, an alternating current feeder circuit, a distribution transformer connecting said circuits, a variable load connected to said circuit, a booster transformer including a voltage boosting series winding in said feeder circuit and a shunt winding connected across said circuit, a saturable reactor having an alternating current coil connected in series with said shunt winding, a direct current saturating winding on said reactor, and means including a rectifier for varying the current in said saturating winding in proportion to variations in the load current of said feeder circuit.

9. In a system of distribution, in combination, an alternating current power supply circuit, a feeder circuit, a transformer connecting said circuits, a variable load connected to said feeder circuit, a booster transformer including a series winding in said feeder circuit and a shunt winding connected across said circuit, a saturable reactor in series with said shunt winding, means for varying the saturation of said reactor in accordance with variations in the magnitude of said load current, and means associated with said reactor for producing a voltage in said feeder circuit which neutralizes the no load voltage boost of said booster transformer, said means tending to saturate said reactor upon an increase in current in said feeder circuit.

In witness whereof, I have hereunto set my hand this 24th day of April, 1930.

LOUIS W. THOMPSON.